(12) United States Patent
Won et al.

(10) Patent No.: US 7,826,111 B2
(45) Date of Patent: Nov. 2, 2010

(54) COLOR CONVERSION METHOD USING A COLORS LOOK-UP TABLE

(75) Inventors: Seok-Jin Won, Seongnam-si (KR); Sung-Dae Cho, Yongin-si (KR); Young-Min Jeong, Suwon-si (KR); Yun-Je Oh, Yongin-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 996 days.

(21) Appl. No.: 11/635,952

(22) Filed: Dec. 8, 2006

(65) Prior Publication Data
US 2007/0177174 A1    Aug. 2, 2007

(30) Foreign Application Priority Data
Feb. 1, 2006    (KR) ...................... 10-2006-0009715

(51) Int. Cl.
*G03F 3/00*    (2006.01)
*G06T 9/00*    (2006.01)
*G09G 5/06*    (2006.01)

(52) U.S. Cl. .................. 358/518; 358/523; 358/524; 358/525; 358/1.9; 345/555; 345/556; 345/600; 345/601; 345/602; 345/603; 345/604; 345/605; 382/232

(58) Field of Classification Search ................ 358/518, 358/523, 524, 525, 1.9; 345/555, 600–605, 345/556; 382/232
See application file for complete search history.

(56) References Cited

U.S. PATENT DOCUMENTS 4,752,822 A * 6/1988 Kawamura .................. 358/523
5,130,786 A * 7/1992 Murata et al. ........... 375/240.25
5,592,591 A * 1/1997 Rolleston ..................... 358/1.5
5,751,233 A * 5/1998 Tateno et al. .................. 341/67
5,805,735 A * 9/1998 Chen et al. ................... 382/239

(Continued)

FOREIGN PATENT DOCUMENTS

JP    09-069961    3/1997

(Continued)

*Primary Examiner*—David K Moore
*Assistant Examiner*—Beniyam Menberu
(74) *Attorney, Agent, or Firm*—Cha & Reiter, LLC

(57) ABSTRACT

Disclosed is color conversion method using a color look-up table. The method includes the steps of: generating a color look-up table using information on the difference of each channel before and after a conversion of each color; and converting the colors using the generated color look-up table. The step of generating the color look-up table includes identifying the maximum difference value among several difference values and generating a first compressed table to initially compress the difference values using the maximum difference value. Further, the step of generating the color look-up table further includes determining, using a predetermined algorithm, whether precedence bits can be removed in the difference values stored in the first compressed table, if yes, removing the corresponding checked bits and storing the converted channel value in a separate auxiliary color table and, if no, storing an index relating to the auxiliary color table as the corresponding difference value, and generating a secondary compressed table that secondarily compresses the initially compressed difference value and adding type information that indicates if information stored as each difference value is the difference value or the index.

4 Claims, 7 Drawing Sheets

| R | G | B | | L | a | b |
|---|---|---|---|---|---|---|
| 73 | 29 | 28 | | 30 | 29 | 11 |
| 52 | 39 | 32 | | 31 | 8 | 10 |
| 103 | 101 | 85 | | 51 | 2 | 14 |
| 67 | 73 | 53 | | 41 | −5 | 12 |
| 35 | 43 | 24 | | 30 | −7 | 9 |
| 27 | 48 | 33 | | 30 | −19 | 8 |
| 28 | 44 | 43 | | 30 | −19 | −2 |
| 33 | 40 | 47 | | 30 | −6 | −8 |
| 23 | 20 | 42 | | 25 | 2 | −19 |
| 42 | 26 | 36 | ⟷ | 30 | 12 | −1 |
| 128 | 52 | 60 | | 42 | 56 | 17 |
| 88 | 70 | 51 | | 40 | 16 | 17 |
| 77 | 77 | 46 | | 41 | 4 | 23 |
| 90 | 107 | 73 | | 51 | −13 | 24 |
| 60 | 86 | 56 | | 40 | −20 | 15 |
| 44 | 87 | 56 | | 40 | −33 | 14 |
| 51 | 77 | 71 | | 40 | −22 | −1 |
| 32 | 39 | 60 | | 30 | −2 | −18 |
| 29 | 38 | 71 | | 30 | 0 | −27 |
| 55 | 27 | 39 | | 31 | 21 | −4 |

U.S. PATENT DOCUMENTS

| | | | |
|---|---|---|---|
| 7,126,611 B1 * | 10/2006 | Weed | 345/589 |
| 2006/0007497 A1 * | 1/2006 | Yokochi | 358/3.27 |
| 2006/0033939 A1 * | 2/2006 | Han | 358/1.9 |
| 2006/0269152 A1 * | 11/2006 | Fenney | 382/232 |
| 2007/0195342 A1 * | 8/2007 | Sugiura et al. | 358/1.9 |
| 2009/0024643 A1 * | 1/2009 | Mittal | 707/101 |

FOREIGN PATENT DOCUMENTS

| | | |
|---|---|---|
| JP | 2000-188696 | 7/2000 |
| JP | 2003-219191 | 7/2003 |
| JP | 2004-208128 | 7/2004 |
| JP | 2005-249821 | 9/2005 |

* cited by examiner

| R | G | B | | L | a | b |
|---|---|---|---|---|---|---|
| 73 | 29 | 28 | | 30 | 29 | 11 |
| 52 | 39 | 32 | | 31 | 8 | 10 |
| 103 | 101 | 85 | | 51 | 2 | 14 |
| 67 | 73 | 53 | | 41 | -5 | 12 |
| 35 | 43 | 24 | | 30 | -7 | 9 |
| 27 | 48 | 33 | | 30 | -19 | 8 |
| 28 | 44 | 43 | | 30 | -19 | -2 |
| 33 | 40 | 47 | | 30 | -6 | -8 |
| 23 | 20 | 42 | ⇔ | 25 | 2 | -19 |
| 42 | 26 | 36 | | 30 | 12 | -1 |
| 128 | 52 | 60 | | 42 | 56 | 17 |
| 88 | 70 | 51 | | 40 | 16 | 17 |
| 77 | 77 | 46 | | 41 | 4 | 23 |
| 90 | 107 | 73 | | 51 | -13 | 24 |
| 60 | 86 | 56 | | 40 | -20 | 15 |
| 44 | 87 | 56 | | 40 | -33 | 14 |
| 51 | 77 | 71 | | 40 | -22 | -1 |
| 32 | 39 | 60 | | 30 | -2 | -18 |
| 29 | 38 | 71 | | 30 | 0 | -27 |
| 55 | 27 | 39 | | 31 | 21 | -4 |

TYPE INFORMATION

AUXILIARY COLOR TABLE

COLOR CONVERSION METHOD USING A COLORS LOOK-UP TABLE

CLAIM OF PRIORITY

This application claims priority to application entitled "Method For Generating Colors Look-Up Table And Converting Colors Using The Same," filed with the Korean Intellectual Property Office on Feb. 1, 2006 and assigned Serial No. 2006-9715, the contents of which are incorporated herein by reference.

BACKGROUND OF THE INVENTION

1. Field of the Invention

The present invention relates to converting colors using a color look-up table in order to create colors to be displayed/output on/to an appropriate display or output unit, and more particularly to a method for generating the color look-up table and converting colors using the same.

2. Description of the Related Art

Various devices reproducing colors, such as scanners, printers, monitors, and mobile LCDs, have been made more multi-functional, more high-quality, and more inexpensive in order to satisfy users' various needs. The color reproduction devices have used different color spaces or color models according to application fields. For example, a Red-Green-Blue (RGB) color space has been used in a computer monitor field, and a Cyan-Magenta-Yellow-Black (CMYK) color space has been used in a printing field. Further, a Commission International de l'Eclairage (CIE) color space has been used to define a device-independent color, which can exactly reproduce colors in any device. The CIE color space may be classified into CIE-XYZ, CIE L*a*b*, and CIE LUV color spaces. Being easily used and expressing a great amount of colors, the CIE color space is widely used in computers.

The RGB color model is mainly used to express the colors in digital images. However, the RBG color model is not apparatus-independent and renders accurate color correction difficult. Thus, a color conversion operation is generally carried out in order to convert the RGB color model into the CIE L*a*b color model, etc.

Conventional color conversion technologies have used an approximation method in the simple form of interpolation based on a color look-up table or multi-nominal regression equation. There is a need in the art to reduce storage space and to improve conversion performance. Referring to FIG. 1, the interpolation based on the color look-up table, which is the best popular color conversion technology, can be carried out as follows. First, during the conversion of the entire color space, some of colors are sampled and stored in the form of a color look-up table. The residual colors that are not stored in the color look-up table, are converted using various interpolation methods such as tetrahedral interpolation and trilinear interpolation, etc.

Pairs of color values before and after the conversion of colors are stored in the color look-up table. In FIG. 1, RGB item indicates the colors before the conversion of the colors, and Lab item shows the colors after the conversion of the colors. In the case where the color format can be predicted before the conversion, it is possible to store only the converted colors in the color look-up table. If the colors in the color look-up table are sequentially defined at intervals of 51, for example, [0, 0, 0], [0, 0, 51], [0, 0, 102], . . . , [204, 255, 255], and [255, 255, 255], the colors cannot be stored in the color look-up table efficiently.

Such an interpolation method based on the color look-up table has high accuracy and high speed operation, as compared with the method using the multi-nominal regression equation. Disadvantageously, however, the interpolation method requires a large space to store its color values.

SUMMARY OF THE INVENTION

Accordingly, the present invention has been made to reduce or overcome the above-mentioned problems occurring in the prior art. One object of the present invention to provide a method for generating a color look-up table and converting colors using the same, which can save storage space for a color look-up table while preventing the deceleration of the color conversion.

According to an aspect of the present invention, a color conversion method using a color look-up table is provided. The method includes the steps of: generating a color look-up table using information on the difference of each channel before and after a conversion of each color; and converting the colors using the generated color look-up table.

Preferably, the step of generating the color look-up table includes identifying the maximum difference value among several difference values and generating a first compressed table to initially compress the difference values using the maximum difference value. Further, the step of generating the color look-up table includes determining, using a predetermined algorithm, whether precedence bits can be removed in the difference values stored in the first compressed table, if yes, removing the corresponding checked bits and storing the converted channel value in a separate auxiliary color table and, if no, storing an index relating to the auxiliary color table as the corresponding difference value, and generating a secondary compressed table that secondarily compresses the initially compressed difference value and adding type information that indicates if information stored as each difference value is the difference value or the index.

BRIEF DESCRIPTION OF THE DRAWINGS

The present invention will be more apparent from the following detailed description taken in conjunction with the accompanying drawings, in which.

DETAILED DESCRIPTION

Hereinafter, an embodiment of the present invention will be described in detail with reference to the accompanying drawings. Hereinafter, preferred embodiments of the present invention will be described with reference to the accompanying drawings. In the following description of the present invention, a detailed description of known functions and configurations incorporated herein is omitted to avoid making the subject matter of the present invention unclear.

Figure 1:
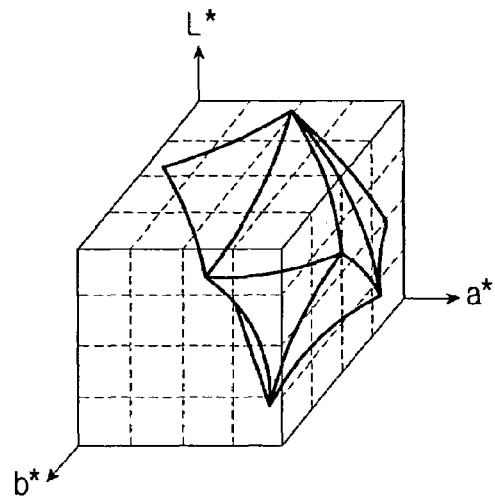
FIG. 1 is a view illustrating a method for converting color using a conventional color look-up table.
Figure 2:
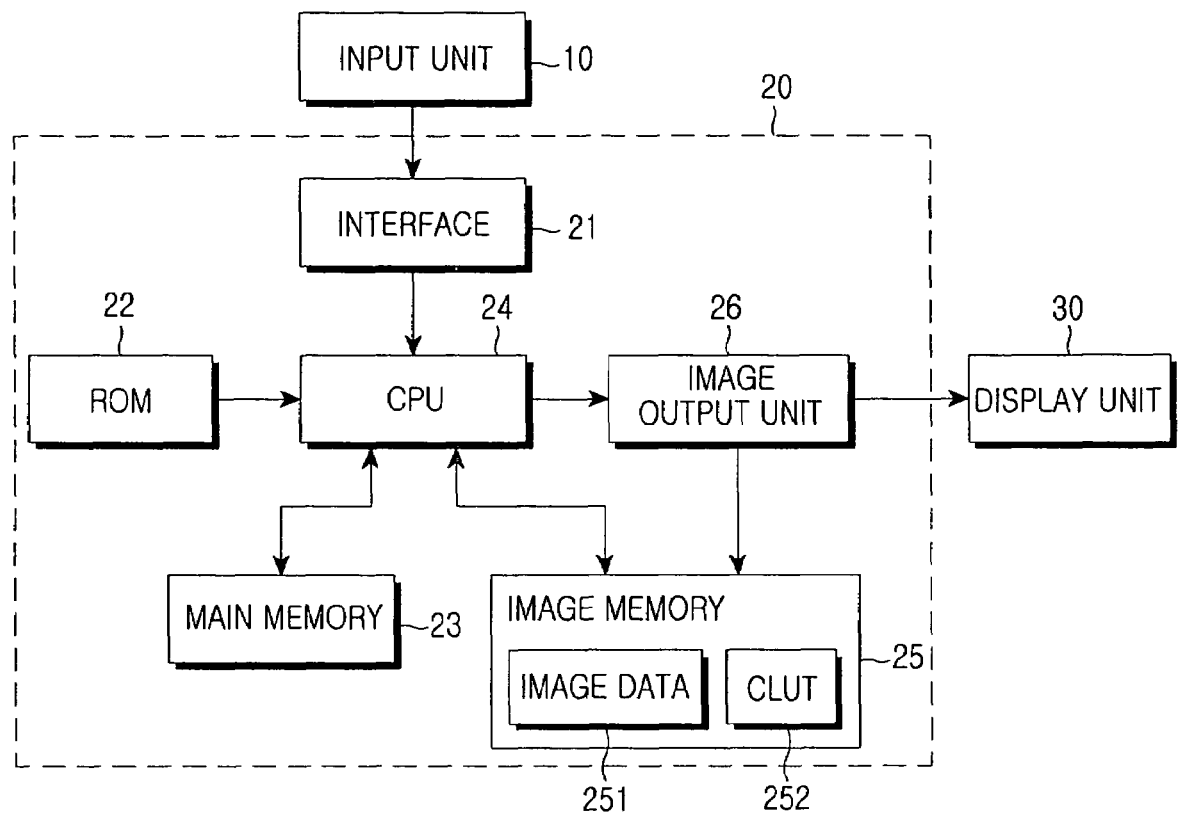
FIG. 2 is a block diagram schematically showing the configuration of an apparatus for generating a color look-up table and converting color using the color look-up table according to the present invention.

FIG. 2 is a block diagram schematically showing the configuration of an apparatus for generating a color look-up table and converting color using the color look-up table according to the present invention. As shown in FIG. 2, the apparatus includes an input unit 10, an image processor 20, and a display unit 30. The input unit 10 generates image data appropriately, and transmits the generated image data to the image processor 20. The image processor 20 carries out the process of converting and correcting the colors of the image data and outputs the converted and corrected image data to the display unit 30. The display unit 30 Displays the image data.

The image processor 20 is provided with an interface 21, a ROM 22, a main memory 23, an image memory 25, a CPU 24, and an image processing unit 26.

When the image processor 20 is connected to the input unit 10 through the interface 21, the CPU 24 receives the image data input from the input unit 10 through the interface 21. The CPU 24 then temporarily stores the received image data in the main memory 23. The ROM 22 stores programs and the like in advance, which are required to perform the operation of processing the image data. The CPU 24 controls the entire operation of the image processor 20. In particular, the CPU 24 initially processes the image data stored in the main memory 23 and then stores the processed image data in the image memory 25. The image output unit 26 performs the operation of converting the image data stored in the image memory 25 into signals (e.g. to generate video signals) and then outputs the generated (video) signals to the display unit 30.

The image memory 25 has an image data region 251 for storing the image data, and a color look-up table region 252. The CPU 24 converts colors according to the color information in the color look-up table of the color look-up table region 252 that is indicated by the image data of the image data region 251.

According to a feature of the present invention, information on the difference value before and after the color conversion is stored in the color look-up table region 252, instead of information on the color after the color conversion Further, such information on the difference value is compressed in two steps, i.e. first and second steps, by using a compression method according to the feature of the present invention. Difference tables can be stored according to RGB channels of the color. Hereinafter, the method for storing the information on the difference values will be described.

Figure 3A:
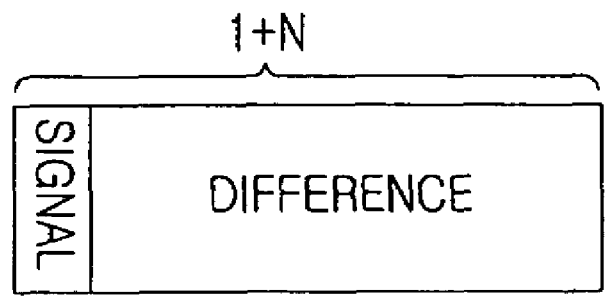
FIG. 3 is a view illustrating a method for generating the first compressed table during the generation of the color look-up table according to the present invention, in which a color difference value is stored in the first compressed table.
Figure 3B:
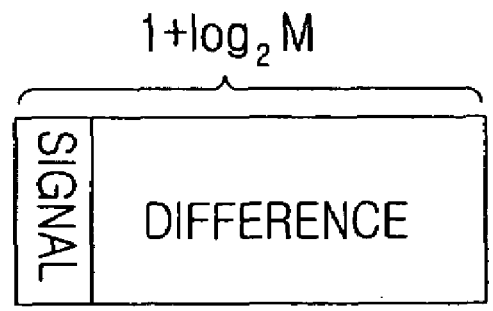

FIG. 3 is a view illustrating a method for generating the first compressed table during the generation of the color look-up table according to the present invention, in which a color difference value is stored in the first compressed table. As shown in FIG. 3A, if the number of the bits of the current channel is N, the difference of the channel values before and after the color conversion is recorded in an $(1+N)^{th}$ bit field table (including 1 bit as a signal bit). With relation to the difference value, if the channel value before the color conversion is equal to or larger than that after the color conversion, the signal bit may be set to zero (0). If the channel value before the color conversion is smaller than that after the color conversion, the signal bit may be set to one (1).

As described above, if basic information on the difference value is generated, the maximum of the difference valve is identified. Then an information storage field is formed by only the number of the bits corresponding to the maximum of the difference value, so as to initially compress the information on the difference value. If the maximum of the difference value is M (ignoring the signal bit), the difference value can be stored in a $\log_2 M$ bit. Therefore, it is possible to compress a basic difference value table with the $(1+N)^{th}$ bit field shown in FIG. 3A into the first compressed table with the $(1+\log_2 M)^{th}$ bit field shown in FIG. 3B.

Figure 4A:
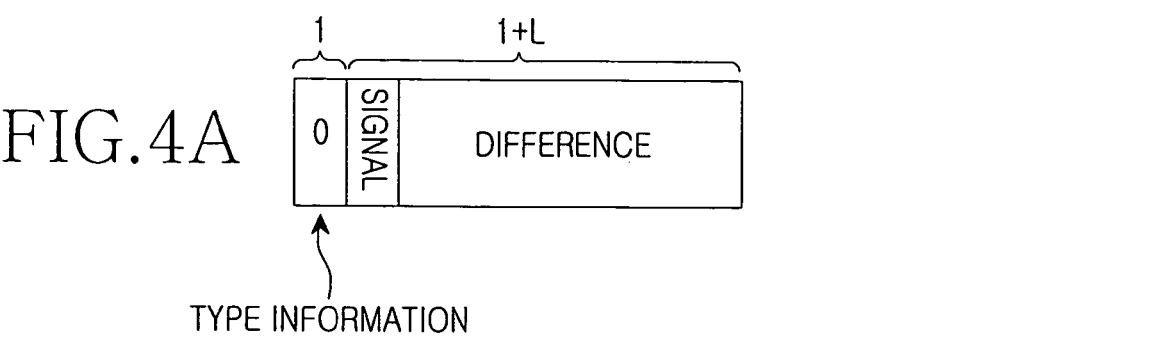
FIG. 4 is a view illustrating a method for generating the secondary compressed table during the generation of the color look-up table according to the present invention, in which a color difference value is stored in the secondary compressed table.
Figure 4B:
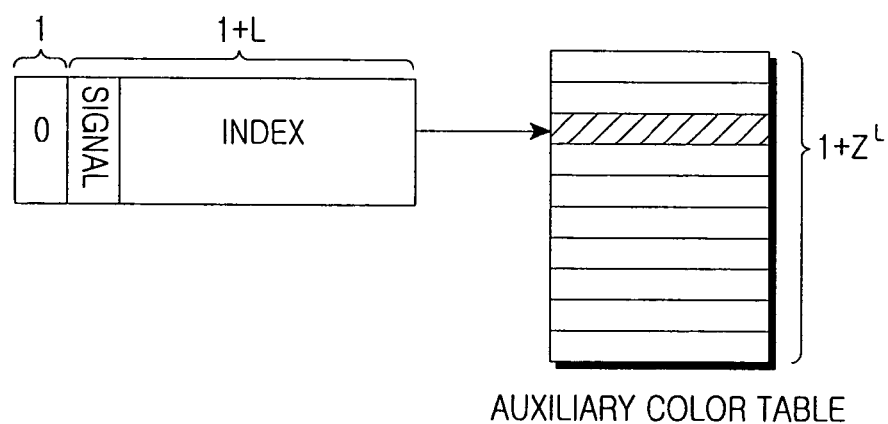
Figure 5:
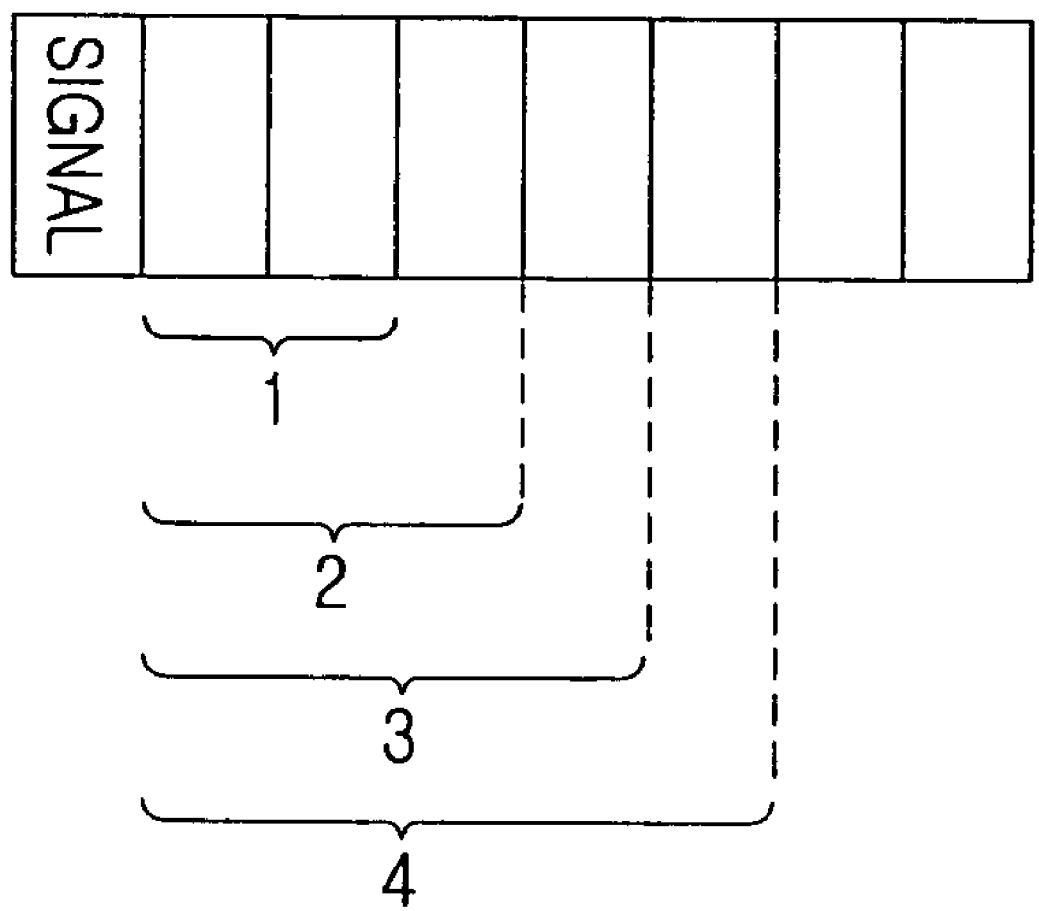
FIG. 5 is a view illustrating an order of checking bits of the color difference value in order to generate the secondary compressed table during the generation of the color look-up table according to the present invention.

FIG. 4 is a view illustrating a method for generating the secondary compressed table during the generation of the color look-up table according to the present invention, in which a color difference value is stored in the secondary compressed table. Referring to FIG. 4, in the method of secondly compressing the first compressed table, the possibility of removing precedence bits in the difference value which has been initially compressed (except for signal bit) is checked. The checking is sequentially carried out from two precedence bits to subordinate bits by one bit. If all the checked bits from the precedence bits to the subordinate bits have a difference value of 0, the checked bits can be removed. If the precedence bits to be removed have a difference value of 1, the converted channel value is stored in a separate auxiliary color table, and only the index is stored in the difference table. Type information of 1 bit, which indicates that the corresponding secondary compressed field shows the difference value or the above-mentioned index, is added to the secondary compressed table. Since the type information of 1 bit is added to the secondary compressed table, the effect of the compression disappears if only one precedence bit is removed.

As described above, if the precedence bits are removed, the secondary compressed table can be stored using only the field from which the precedence bits are removed. Therefore, the saved storage space is calculated at each checking step. The secondary compressed table is set to the checking step which can provide the greatest effect and finally compressed.

A following equation (1) is used to calculate the size of the storage space necessary for each compression. In the equation (1), T is the number of colors stored in the color look-up table, L is the number of difference bits after the secondary compression (excluding the signal bit), and C is the number of the channels stored in the secondary compressed color table. The number of channels which may be stored in the color table after the secondary compression is at most $2^L$.

Equation (1)
Difference table before compression: $S_0=(1+N)*T$
Difference table after first compression: $S_1=(1+\log_2 M)*T$
Difference table after secondary compression: $S_2=(2+L)*T+N*C$ On the other hand, if $S=S_1-S_2$, one of various values of L is selected so that $S>0$, $|S|$ becomes the maximum, and $C \leq 2^L$. When the value of L is selected, the secondary compression is carried out. If the value of L is not found, the secondary compression is not performed because of a lack of effect. The compression process is finished during the first compression.

Figure 6:
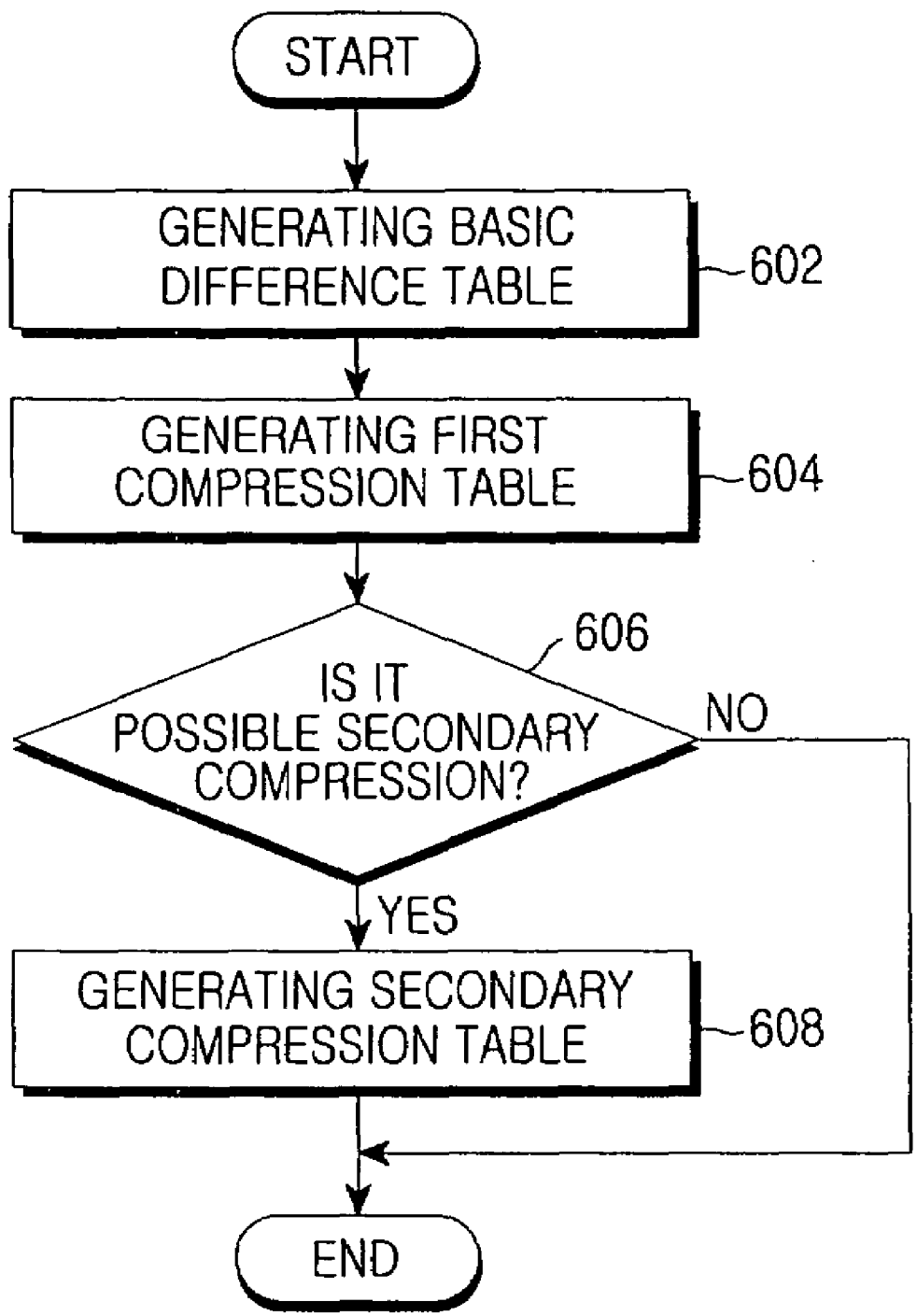
FIG. 6 is a flowchart illustrating processes for generating the color look-up table according to the present invention.

FIG. 6 is a flowchart illustrating processes for generating the color look-up table according to the present invention. Referring to FIG. 6, first, a basic difference table is generated according to the difference of the channels before and after the conversion in step 602. Then, the maximum difference is identified among the differences of the generated basic difference table. An information storage field is formed by only the number of bits necessary for the maximum difference so as to generate the first compressed table which is initially compressed in step 604. Next, it is determined if the first compressed table can be compressed to the secondary compressed table in step 606. In such a secondary compression step, a check is performed to determine if there is the possibility of removing the precedence bit from the difference value of the first compressed table. Further, the storage space is calculated according to checking orders, so that the efficiency of the secondary compression can be identified. If it is determined that the secondary compression is ineffective, the secondary compression step is ended. If it is determined that the secondary compression is effective, step 608 is carried out. In step 608, the secondary compression operation is carried out to generate the secondary compressed table.

As shown in FIG. 6, in the operation of generating the color look-up table the difference table is also initially generated. After the first compression is carried out with respect to the difference table, the possibility of the secondary compression of the difference table is checked. If necessary, the secondary compression is performed.

Figure 7:
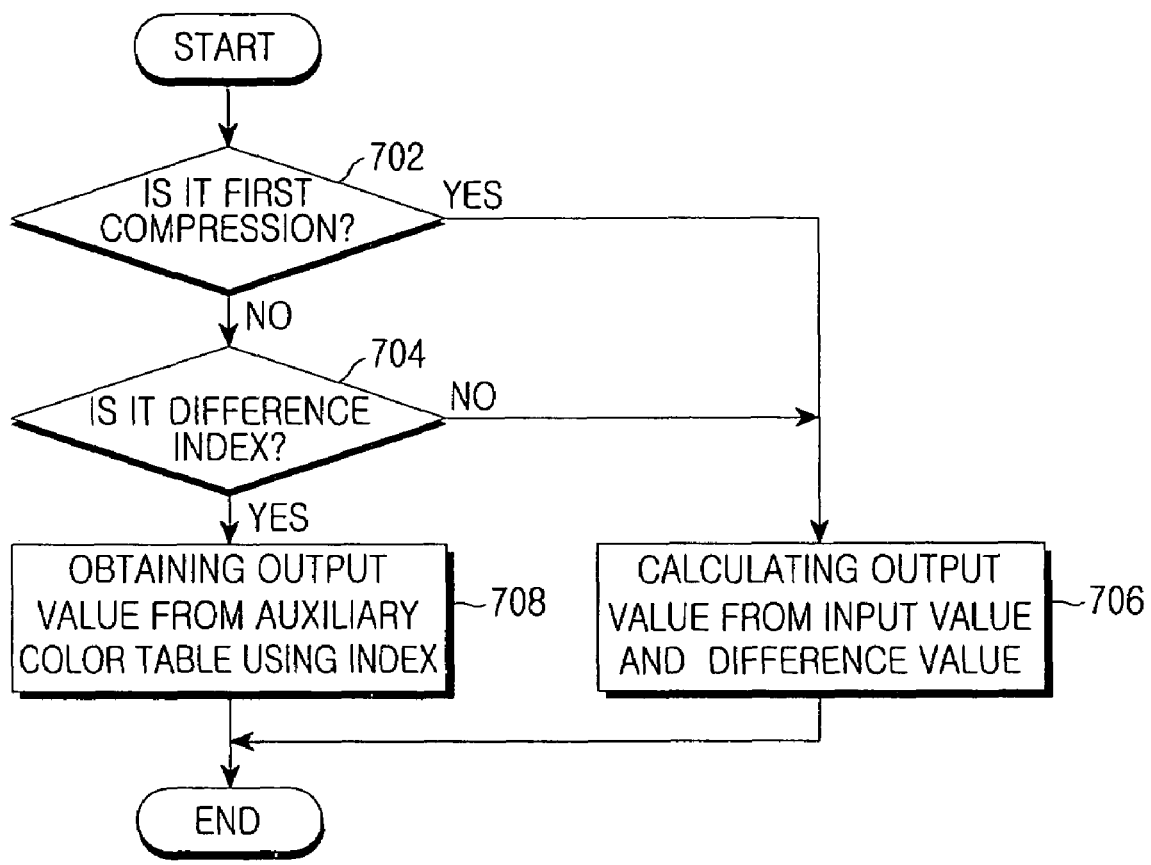
FIG. 7 is a flowchart illustrating processes for converting color using the color look-up table according to the present invention.

FIG. 7 is a flowchart illustrating processes for converting color using the color look-up table according to the present invention. Referring to FIG. 7, the color conversion table is identified and it is determined if the color conversion table is the first compressed table. If the color conversion table is the first compressed table, step 706 is carried out to calculate an output value from an input value using the difference value stored in the corresponding table. However, if the color conversion table is not the first compressed table but the secondary compressed table, step 704 is carried out. In step 704, it is possible to identify information on the type of the corresponding color difference value of the corresponding table. Then, it is determined if the corresponding difference value is a difference index. If the corresponding difference value is not the difference index, step 706 is carried out to calculate an output value from an input value using the difference value stored in the corresponding table. If the corresponding difference value is the difference index, step 708 is carried out. In step 708, it is possible to obtain the output value already stored in an auxiliary color table by using the index.

As shown in FIG. 7, in the color conversion operation, if the corresponding color look-up table is the first compressed table, the output color can be obtained by adding or subtracting the difference to/from the input color. Where the corresponding color look-up table is the secondary compressed table, if the secondary compressed table is compressed in the form of the difference type, the output color can be obtained in a similar manner to the first compression. If the secondary compressed table is compressed in the form of the index type, the output color can be obtained by directly reading the output value from the auxiliary color table using the stored index.

As described above, in the method of generating the color look-up table and converting the colors using the same, a reduction in storage space for the color look-up table can be achieved. Thus, when the method of the present invention is realized in software and hardware, it is possible to reduce cost and to improve spatial efficiency.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A color conversion method operable in a processing system, the processing system comprising a processor and a memory the processor executing the method steps of:

generating a color look-up table using information based on a difference of each channel before and after a conversion of each color by identifying a maximum difference value among the several difference values; and generating a first compressed table to compress the initial difference values using the maximum difference value, wherein each channel value includes a sign bit, wherein compressing the difference values comprises maintaining only a number of bits necessary for storing the maximum difference value, wherein generating the color look-up table further comprises: determining, using a predetermined algorithm, whether precedence bits can be removed in the difference values stored in the first compressed table; if yes, removing the corresponding checked bits and storing the converted channel value in a separate auxiliary color table and, if no, storing an index relating to the auxiliary color table as the corresponding difference value; and generating a secondary compressed table that secondarily compresses the initially compressed difference values and adds a type information that indicates if information stored as each difference value is a difference value or an index;

converting the colors using the generated color look-up table; and outputting the converted colors.

2. The method as claimed in claim 1, wherein the step of generating the secondary compressed table comprises the steps of:

checking a possibility of removing precedence bits after it is determined if the preset number of the precedence bits is 0 (zero) with respect to each difference value stored in the first compressed table;

removing the corresponding checked bits if all the checked bits are 0, and storing the converted channel value in a separate auxiliary color table and storing an index relating to the auxiliary color table as the corresponding difference value if only one of the precedence bits to be removed has a value of 1 (one); and adding type information which indicates if information stored as each difference value is the difference value or the index.

3. The method as claimed in claim 2, wherein the number of the removed precedence bits is set by comparing the storage spaces for the first compressed table, the secondary compressed table, and the auxiliary color table with one another.

4. The method as claimed in claim 1, wherein the step of converting the colors comprises the steps of:

determining if the color conversion table is the first compressed table and calculating an output value from an input value using the difference value stored in the corresponding table if the color conversion table is the first compressed table;

identifying the type information of the corresponding color difference value if the color conversion table is not the first compressed table;

calculating the output value from the input value using the difference value stored in the corresponding table if the corresponding difference is not the index as a result of the identification step; and obtaining the value, stored in the auxiliary color table, as the output value if the corresponding difference value is the index as the result of the identification step.

* * * * *